United States Patent [19]
Ivey

[11] 3,783,483
[45] Jan. 8, 1974

[54] METHOD OF MAKING A FLUID COUPLING MEMBER
[75] Inventor: John Saxon Ivey, Hitchin, England
[73] Assignee: Borg-Warner Limited, Letchworth, Hertfordshire, England
[22] Filed: Sept. 11, 1972
[21] Appl. No.: 287,959

Related U.S. Application Data
[62] Division of Ser. No. 73,526, Sept. 18, 1970, Pat. No. 3,709,635.

[52] U.S. Cl.......... 29/156.8 FC, 29/157.3 R, 29/455, 29/471.1
[51] Int. Cl...... B21k 3/04, B23p 15/02, B23p 15/04
[58] Field of Search.................... 29/455, 156.8 FC, 29/471.1, 157.3 R; 416/183, 186, 187

[56] References Cited
UNITED STATES PATENTS

| | | |
|---|---|---|
| 1,897,947 | 2/1933 | Howell........................ 416/186 UX |
| 2,336,231 | 12/1943 | Dodge..................... 29/156.8 FC X |
| 2,542,913 | 2/1951 | Ensign .......................... 29/156.8 FC |
| 2,756,032 | 7/1956 | Dowell............................ 29/455 UX |
| 3,224,079 | 12/1965 | Dybuig............................. 416/186 X |
| 3,267,559 | 8/1966 | Laux................................... 29/455 X |
| 3,362,338 | 1/1968 | Stethem............................. 416/183 |
| 3,636,607 | 1/1972 | De Marco......................... 29/455 X |

*Primary Examiner*—Charlie T. Moon
*Attorney*—Robert L. Zieg

[57] ABSTRACT

A hydraulic coupling member including an outer hollow part-toroidal shell and an internal hollow part-toroidal core ring and blading between and connected to the shell and core ring, the blading being provided by an undulating element with the undulations of generally triangular section providing back-to-back triangular section flow channels. The undulating element can be cast or stamped in a single piece, or formed segmentally and secured together, and then connected to the shell and core ring.

10 Claims, 3 Drawing Figures

3,783,483

METHOD OF MAKING A FLUID COUPLING MEMBER

This is a division, of application Ser. No. 73,526 filed 9/18/70, now U.S. Pat. No. 3,709,635.

BACKGROUND OF THE INVENTION

1. Field of the Invention

THIS INVENTION relates to hydraulic couplings and more particularly to hydraulic coupling members, such as impellers and turbines, and methods of making the same.

2. Description of the Prior Art

Blading of the hydraulic coupling members have been formed of sheet metal stampings with undulations of square or rectangular section to provide similarly shaped flow channels, the blading being secured to a hollow annular shell and core ring. Such blading is formed by initially providing a single metal strip, or a flat or conical metal disc, and die stamping the strip or disc to provide undulations of U-shaped section forming square or rectangular section flow channels when assembled with the shell and core ring by welding, soldering or brazing. The advantages of this construction and assembly are lightweight coupling members in which the blades are supported with torsional flexibility while providing radial rigidity of the structure, and economy in manufacture and assembly. In the assembly of the coupling member, the curved wall portions, forming the blades, of the U-shaped section undulating blading extends between the shell and core ring, and the bases of the U-shaped undulating blading are connected alternately to the semi-toroidal opposed faces of the shell and core ring by spot welding, brazing, or soldering. However, it has been found that, during torque transmission, the radial and circumferential paths of liquid flow in the hydraulic coupling member causes the blading to resonate creating unpleasant noises, and injurious vibration conducive to separating the undulating blading from the shell and core ring.

SUMMARY OF THE INVENTION

The present invention contemplates a hydraulic coupling member having blading provided by an undulating element of generally triangular section having valleys to provide triangular section flow channels and connecting the element to an outer hollow shell and inner core ring by brazing, welding or soldering. A method of making a hydraulic coupling member involves providing blading by forming a triangularly-sectioned undulating member, by suitable casting or pressing from a single strip, bending the strip to form an annulus, welding the annulus ends together, and welding the blading to the shell core ring. Another method of making the blading is forming the triangularly undulating member as segments, positioning the segments circumferentially of the shell and core ring and engaged therewith and then welding the segmental blading to the shell and core ring. Another method of making the blading is to form the blading from a single metal flat or conical disc by stamping, rolling or pressing to provide the triangularly sectioned undulating member, and welding the blading to the shell and core ring.

An object of the invention is to provide an improved blade construction for hydraulic coupling members.

Another object of the invention is to provide a hydraulic coupling member having an improved blade construction formed to provide an undulating element adapted for connection to a hollow shell of the coupling member and providing great mechanical strength with a low weight factor.

Another object of the invention is to provide an improved blade construction for hydraulic coupling member and provided by an undulating element having undulations of generally triangular section providing back-to-back triangular section flow paths.

Another object of the invention is to provide an improved blade construction for hydraulic coupling member and provided by an undulated element having V-shaped sections provided by angularly arranged walls each extending between and connected to an outer hollow shell and inner core ring of the coupling member.

Another object of the invention is to provide a method of manufacture of a hydraulic coupling member including forming blading of the coupling member by pressing or casting, in a single metal strip to provide an undulating element having triangular section fluid flow paths defined by angularly arranged walls, bending the strip to form an annulus, securing the annulus ends together; and securing the blading to the outer shell and inner core ring of the hydraulic coupling member.

Another object of the invention is to provide a method of manufacture of a hydraulic coupling member including forming blading of the coupling member by providing an undulating element, having triangular section fluid flow paths, by pressing or casting a plurality of metal pieces into V-shaped segments, collecting the segments to provide the undulating element, positioning the undulating element to form an annulus, securing the annulus ends together, and securing the undulating element to the outer shell and inner core ring of the hydraulic coupling member.

Another object of the invention is to provide a method of manufacture of a hydraulic coupling member including forming the blading of the coupling member by pressing or casting a single flat or conical metal disc to provide an undulating annular element having triangular section fluid flow paths defined by angularly arranged walls, and securing the blading to the outer shell and inner core ring of the coupling member.

Other objects and advantages of the invention will be evident from the following detailed description when taken in conjunction with the accompanying drawing.

DESCRIPTION OF THE PREFERRED EMBODIMENT

Figure 1:
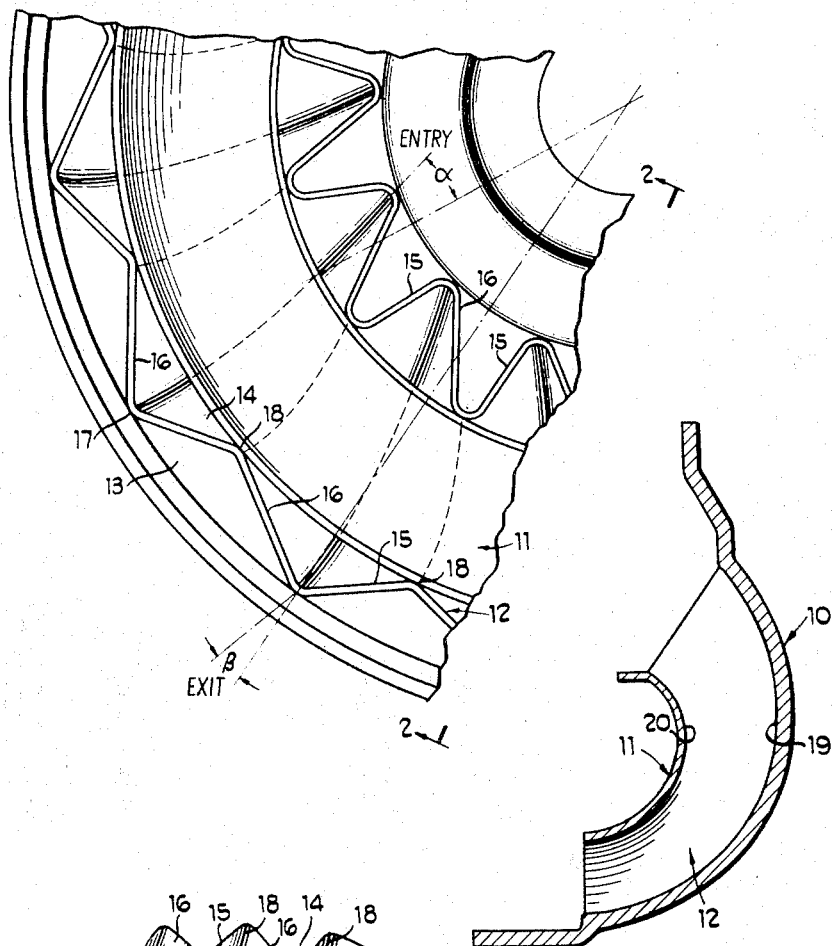
FIG. 1 is a fragmentary elevation of a hydraulic coupling member embodying blading of the invention.
Figure 2:
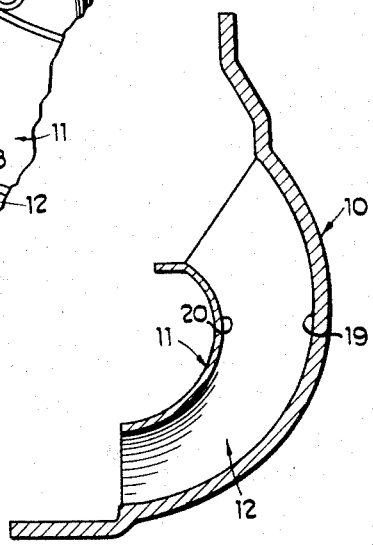
FIG. 2 is a transverse sectional view of the hydraulic coupling member of FIG. 1, looking in the direction indicated by the line 2—2 of FIG. 1.

FIGS. 1 and 2 illustrate a hydraulic coupling member of the torque converting type which may be an impeller adapted to function in cooperation with other hydraulic coupling members in the form of a turbine and stator in a manner well known in the art.

The hydraulic coupling member comprises an outer hollow part-toroidal shell 10 and an inner hollow part-toroidal core shell 11, a blading element 12 in the form of an annular element extending between and connecting with shells 10 and 11. It will be understood that the shells 10 and 11 of the hydraulic coupling element are both annular and complete rings, although only portions thereof are illustrated in the drawing. The shells 10 and 11 and the blading element 12 may be formed of cast metal, but preferably formed as sheet metal stampings to obtain the advantages of lightness in weight.

It has been suggested in the art to form a blading member by stamping a sheet metal strip, or segments of a metal strip, or an annular flat or conical disc, to provide undulations defining generally square or sinusoidal section flow channels when assembled by brazing, welding, or otherwise connecting the blading member to the part-toroidal facing surfaces of the outer shell and inner core ring to provide the hydraulic coupling elment. In such assembly, spaced circumferentially-extending wall portions of the undulating blading member, separated by the blades, are attached to the shells. In operation of the hydraulic coupling having an impeller and turbine elements formed as described, resonance periods occur which phenomena create unpleasant noises, and injurious vibrations. To eliminate such siren and torque shock effects resulting from speeds, inertia and harmonic period ranges in the hydraulic coupling, it has been proposed to provide, a composite blade assembly of individually stamped blade pockets and assembled in circumferentially spaced relation to each other in the outer shell and inner core ring of the hydraulic coupling member, each blade pocket being of U-shaped and composed of two facing blade sections, a backwall section connecting the blade sections and attached to the outer shell, and two opposing flange sections attached to the core ring. It will be apparent that the manufacture of such hydraulic coupling member requires a multiplicity of operations to ensure accurate forming of the individually stamped blade pockets, and precise complicated positioning and spacing of the pockets in the outer shell and inner core ring by holding jigs or clamps for welding or brazing the pockets to the shell and core ring in a manner to ensure satisfactory operational performance.

The present invention is directed to blading for a hydraulic coupling member assembly having advantages over the prior art, in the form of providing greater rigidity of the composite structure of the coupling member, employment of substantially less metal, and avoidance of resonance periods creating unpleasant noises and damaging vibrations.

Figure 3:
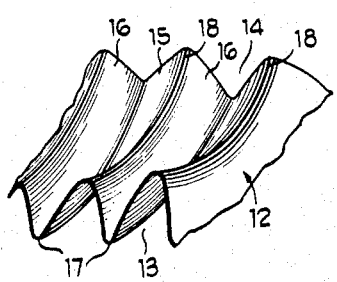
FIG. 3 is a fragmentary perspective view of the blading.

More particularly, the blading 12 of the present invention, as shown in FIGS. 1 and 3, is formed with undulations of generally triangular section to provide back-to-back uniformly spaced triangular section flow channels 13 and 14. As seen in FIG. 1, the channels 13 and 14 are defined by angularly arranged walls 15 and 16 serially disposed and arranged in an annular array circumferentially about the axis of rotation of the coupling member. The undulating blading is curved to a shape enabling it to be located in the space between the outer shell and inner shell. Walls 15 and 16 intercept each other adjacent the shells 10 and 11 to provide ridges 17 and 18 engaging and being welded or brazed to the opposed part-toroidal surfaces 19 and 20 of the outer shell 10 and inner shell 11, respectively. As a result of forming the blading in annular form, the angularly arranged walls forming each ridge 17 are set at a more acute angle $\beta$ (FIG. 1) at the fluid exit side, than the acute angle $\alpha$ of the angularly arranged walls forming the ridge 18 at the fluid entry side. Thus the ridges of the element may be considered as on two spaced part-toruses.

According to one method of making the hydraulic coupling member of the present invention, a single strip of metal is stamped or pressed, or formed by a rolling die operation, to provide an undulating element which may be accordion-pleated with triangular-section pockets and which element is curved in width as seen in FIG. 3. The strip may be bent or coiled to form a conical or helical annular element and its ends are welded together. The annular element is then trimmed and flattened, and then passed through forming rolls to provide a crimping operation to form the curved angularly arranged walls 15 and 16 defining the ridges and valleys affording the triangular-section curved fluid flow channels. The thus formed blading is then sized in a die. Thereafter the blading is attached by spot welding or brazing the ridges 18 to the inner shell 11, the undulating element and inner shell being positioned in a holding jig. The united inner shell and undulating element are placed in the shell 10 and the ridges 17 welded to the shell to complete the hydraulic coupling member assembly. A more expedient manner of assembly of the undulating element, shell and core ring is to assemble these three components together in a clamping jig after copper plating the surfaces of the ridges 17 and 18 and the engaging portions of the shell and core ring to be welded or brazed, the assembly and the clamping jig being inserted in a brazing furnace to bond together firmly the blading to the shell and core ring.

A second method of making a hydraulic coupling member is to form separate pieces of metal, by stamping or pressing, to provide a plurality of triangularly-sectioned blading segments, which may be assembled on the inner shell 11 and in the outer shell 10 by positioning the segments circumferentially thereof and abutting the edges of the segments for welding and brazing the segments together and to the shell and inner shell.

A third method of making a hydraulic coupling member is to provide an annular disc, either flat or conical, and then stamping or pressing the disc in depth and to a form circumferentially to provide the undulating member or blading 12. The blading is attached to the outer shell and core ring as described above in connection with the assembly of the single strip blading with the shell 10 and 11.

The hydraulic coupling member of the present invention is characterised by the novel form of its blading provided by the angularly-arranged walls defining V-shaped undulating sections, disposed in annular array circumferentially about, and extending generally radially of, the axis of rotation of the hydraulic coupling member, the V-sections being their intersecting ends, providing ridges serially connected to the outer and inner part-toroidal shells, and which define with the walls, triangular fluid flow channels in the coupling member. An important feature of such construction is the considerable greater strength and rigidity of the composite structure of the coupling member afforded by the triangular-section of the undulating blading over prior square or U-section undulating blading. In addition, such blading permits loss material to be employed as a thinner metal stock can be used, providing material cost savings. A further and very important advantageous feature is the avoidance of resonance creating disagreeable noises and damaging vibrations.

The various methods of making the hydraulic coupling member of the present invention are believed to be novel, as described, in the manufacture of the blading and its assembly with the outer shell and inner core ring to provide the composite structure of the coupling member.

Various features of the invention have been particularly shown and described; however, it should be obvious to one skilled in the art that modifications may be made therein without departing from the scope of the invention.

I claim:

1. A method of making a fluid coupling member, the steps of providing a first part-toroidal annular shell; providing a second part-toroidal annular shell of smaller diameter than said first shell; providing a blading element in the form of an annular element curved to engage the inner surface of the first shell and outer surface of said second shell and having circumferentially spaced and generally radially extending undulations of triangular sections providing V-section fluid flow channels; and connecting the element and said shells together.

2. A method of making a fluid coupling member as defined in claim 1 in which the annular element is a sheet metal stamping.

3. A method of making a fluid coupling member as defined in claim 1 in which said annular element is manufactured by bending a metal strip to helical form and connecting its ends together to form an annulus, and forming said annulus to provide the undulations therein.

4. A method of making a fluid coupling member as defined in claim 1 including the step of positioning the blading between and in engagement with the shells, prior to connecting the blading and the shells.

5. A method of making a fluid coupling member as defined in claim 1 including the step of assembling the second shell and blading and connecting the blading of the assembly to the first shell.

6. A method of making a fluid coupling member as defined in claim 1 including the steps of copper plating the engageable portions of the blading and shells, clamping the blading between the shells in a jig, and inserting the assembled blade, shells and jig in a brazing furnace to bond the blading to the shells.

7. A method of making a fluid coupling member as defined in claim 1 including the steps of forming separate sheet metal triangular-section blading segments, positioning the segments circumferentially of the first shell and abutting the edges of the segments, positioning the second shell on the blading, and connecting the segments together and to the shells.

8. A method of making a fluid coupling member as defined in claim 1 including the step of providing an annular disc, shaping the disc in depth and circumferentially to form said blading element.

9. A method of making a fluid coupling member, including the steps of providing a first part-toroidal annular shell; providing a second part-toroidal annular shell of smaller diameter than said first shell, forming a strip of metal into a helix; welding the ends of the strip together to form an annulus, flattening the helical strip, shaping the helical strip to provide a blading element having circumferentially spaced and generally radially extending undulations of triangular section therein while curving the strip to engage the inner surface of the first shell and the outer surface of the second shell, sizing the helical strip in a die; positioning the blading element and second shell in engagement; connecting the blading element and second shell; and positioning the assembled blading element and second shell into said first shell to engage the blading element with the first shell; and connecting the blading element and said first shell.

10. A method of making a fluid coupling member, the steps comprising providing a first part-toroidal annular shell; providing a second part-toroidal annular shell of smaller diameter than said first shell, forming a strip of metal into a helix; welding the ends of the strip together to form an annulus, flattening the helical strip, shaping the helical strip to provide a blading element having circumferentially spaced and generally radially extending undulations of triangular section therein while curving the strip to engage the inner surface of the first shell and the outer surface of the second shell, sizing the helical strip in a die; positioning the blading element between and in engagement with the inner surface of the first shell and outer surface of the second shell to assemble the blading element and shells; and connecting the blading element and shells.

* * * * *